Figure 1:
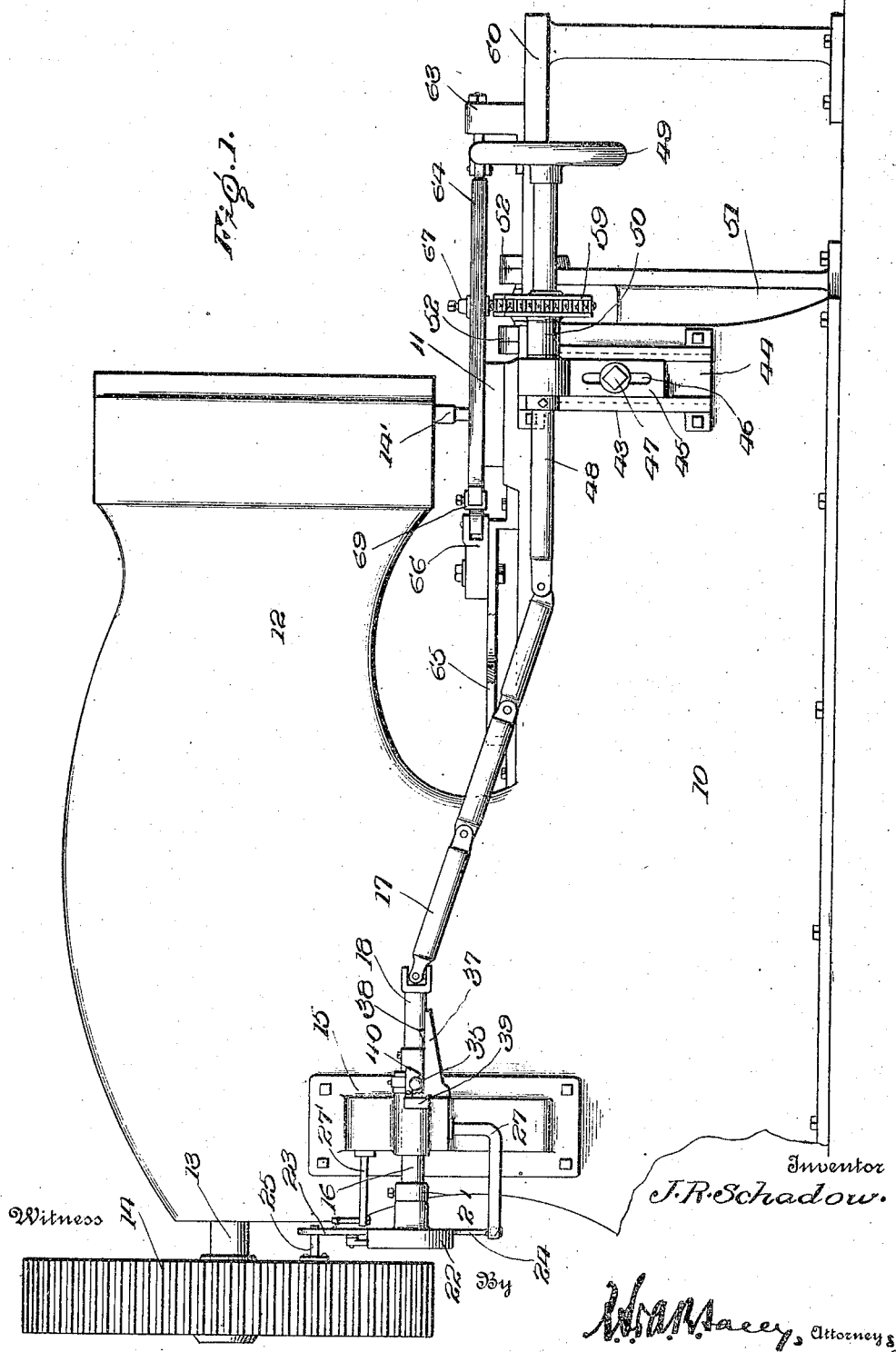

J. R. SCHADOW.
AUTOMATIC FEED MECHANISM FOR PUNCHES.
APPLICATION FILED MAY 1, 1917.

1,250,028.

Patented Dec. 11, 1917.
5 SHEETS—SHEET 1.

Inventor
J. R. Schadow.

Witness

By
Attorneys

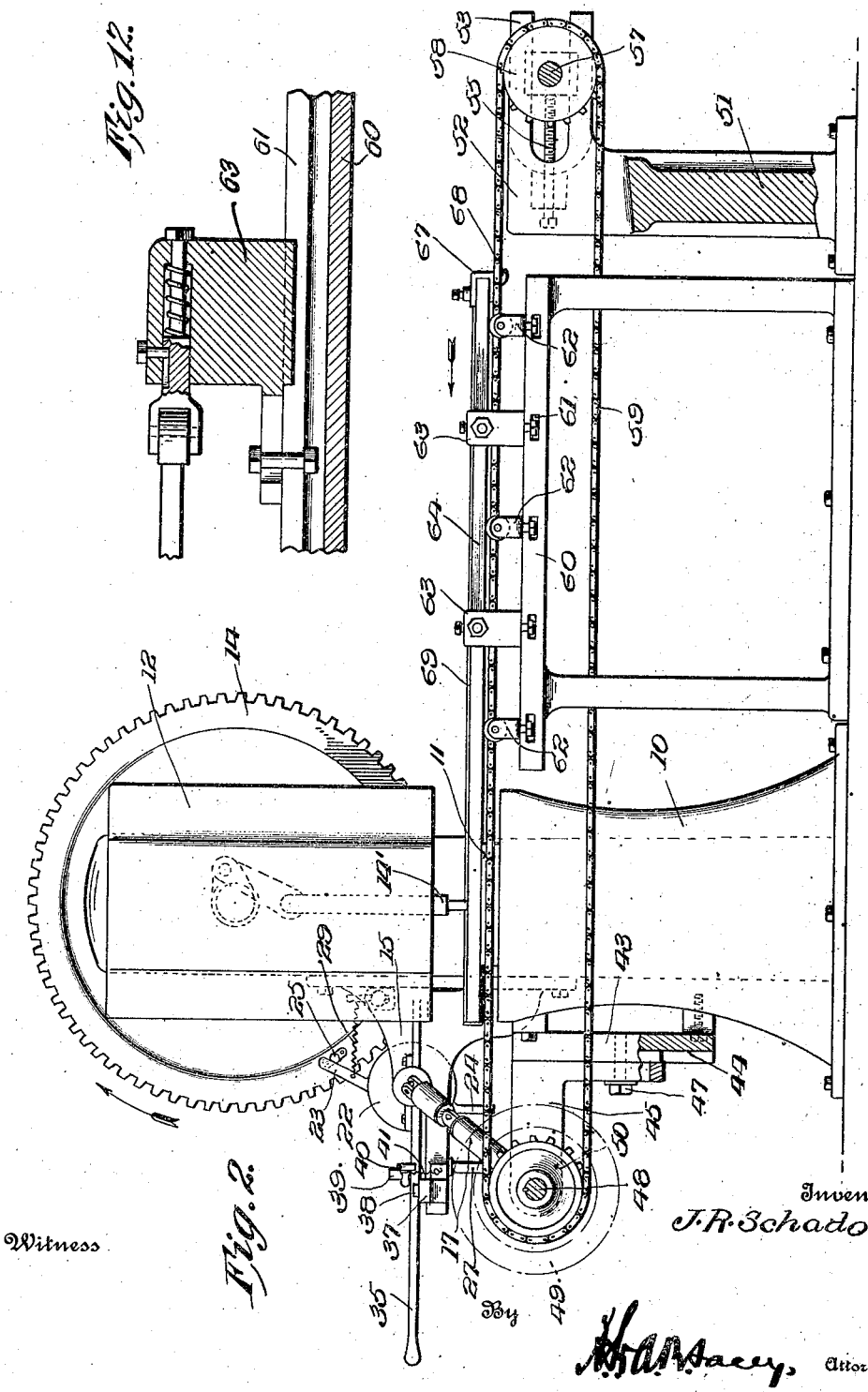

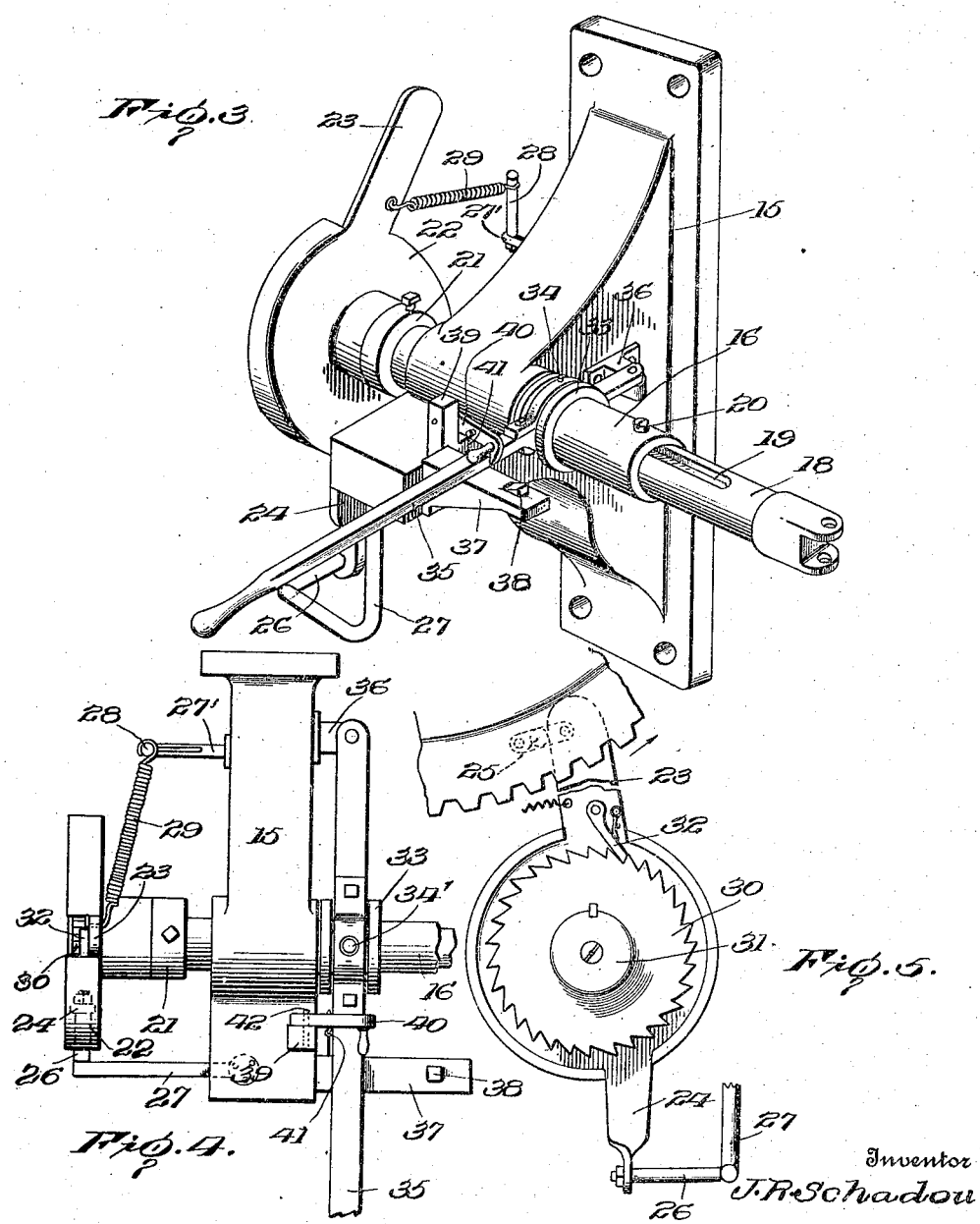

J. R. SCHADOW.
AUTOMATIC FEED MECHANISM FOR PUNCHES.
APPLICATION FILED MAY 1, 1917.
1,250,028.
Patented Dec. 11, 1917.
5 SHEETS—SHEET 4.
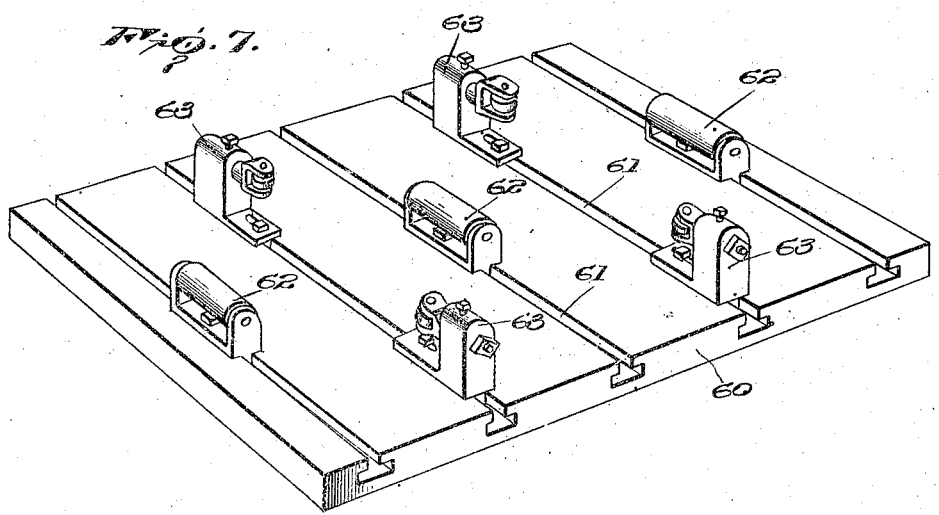
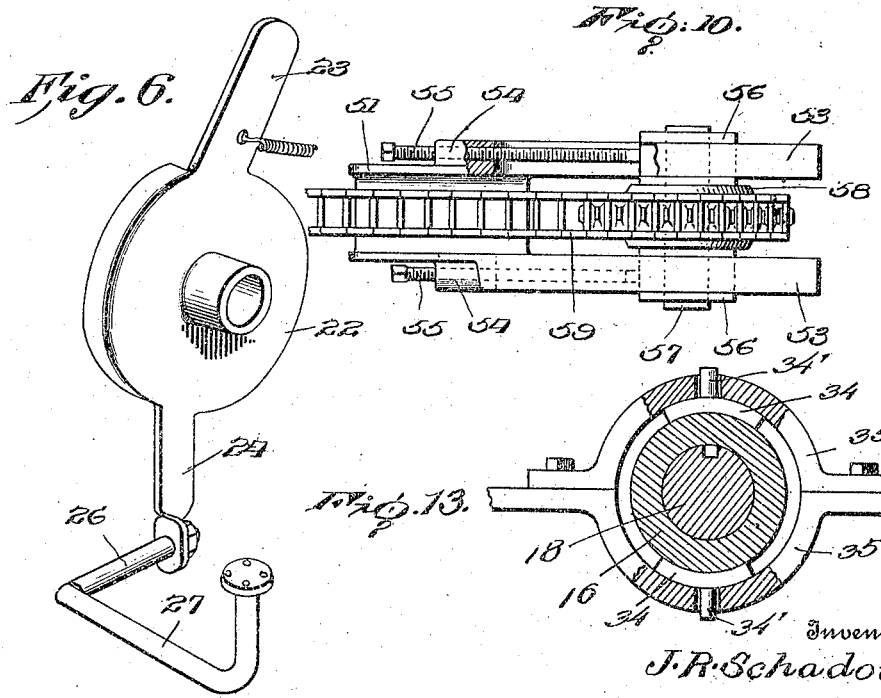
Inventor
J. R. Schadow
By ........., Attorneys

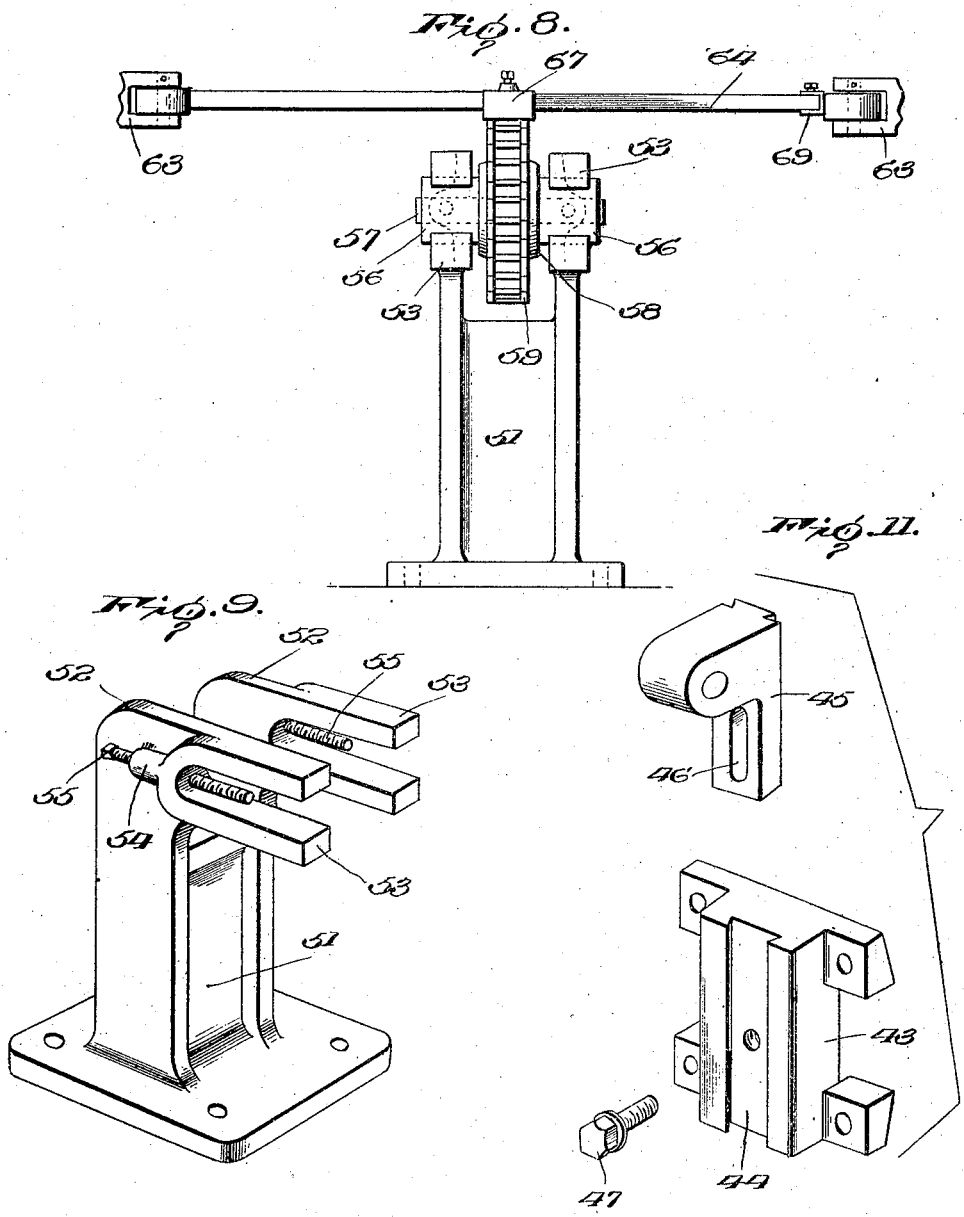

UNITED STATES PATENT OFFICE.

JULIUS R. SCHADOW, OF VALLEJO, CALIFORNIA.

AUTOMATIC FEED MECHANISM FOR PUNCHES.

1,250,028.

Specification of Letters Patent.   Patented Dec. 11, 1917.

Application filed May 1, 1917.   Serial No. 165,704.

*To all whom it may concern:*

Be it known that I, JULIUS R. SCHADOW, a citizen of the United States, residing at Vallejo, in the county of Solano and State of California, have invented certain new and useful Improvements in Automatic Feed Mechanism for Punches, of which the following is a specification.

This invention relates to an improved feed mechanism for sheet metal punches and has as its primary object to provide an arrangement wherein the sheet of metal will be automatically advanced to be operated upon by the punch as the punch is operated.

The invention has as a further object to provide an arrangement wherein the sheet of metal will be advanced by a step by step movement and wherein the length of the step of such movement may be readily varied for accordingly varying the feed of the sheet.

A still further object of the invention is to provide a feed mechanism employing an endless sprocket chain movable beneath the metal sheet for feeding the sheet to the punch and wherein means will be provided for adjustably maintaining such chain taut.

The invention has as a further object to provide an arrangement wherein the drive sprocket for the sprocket chain of the feed mechanism will be removable so that a sprocket of either greater or less diameter may be substituted therefor to accordingly vary the movement to be imparted to the sprocket chain at each depth of the feed mechanism.

And the invention has as a still further object to provide an adjustable mounting for the drive sprocket employed so that when one drive sprocket is removed and another drive sprocket of either greater or less diameter is substituted therefor, the said drive sprocket may be either raised or lowered to maintain the sprocket chain level for properly feeding the metal sheet.

Other and incidental objects will appear as the description proceeds and in the drawings wherein I have illustrated the preferred embodiment of the invention and wherein similar reference characters designate corresponding parts throughout the several views:

Figure 1 is a side elevation showing a conventional type of punch equipped with my improved feed mechanism and particularly illustrating the arrangement of the drive shaft of the said mechanism.

Fig. 2 is an end elevation more particularly showing the mounting of the drive sprocket of the said mechanism and the arrangement of the sprocket chain employed for feeding the metal sheet to the punch, Fig. 3 is a fragmentary perspective view showing the bracket employed for supporting the inner end of the drive shaft and associated parts, Fig. 4 is a fragmentary plan view particularly illustrating the mounting of the lever for shifting the ratchet drum employed to active or inactive position.

Fig. 5 is a face view of the ratchet drum illustrating the pawl and ratchet mechanism associated therewith, Fig. 6 is a perspective view showing the ratchet drum detached and illustrating the stop post employed for limiting the drum in its movement under the influence of the spring connected thereto, Fig. 7 is a fragmentary perspective view of the table and the rest and guide rollers carried thereby for receiving the metal sheet, Fig. 8 is a fragmentary end elevation showing the stand employed for supporting the idler sprocket of the feed mechanism, Fig. 9 is a detail perspective view of the stand shown in Fig. 8, Fig. 10 is a top plan view of the stand partly broken away and illustrating the manner in which the idler sprocket may be adjusted upon the stand for tensioning the sprocket chain of the feed mechanism, Fig. 11 is a detail perspective view of the bracket and slide employed for adjustably supporting the outer end of the drive shaft to which the drive sprocket of the mechanism is connected, Fig. 12 is a fragmentary sectional view illustrating one of the guide rollers of the work supporting table, and Fig. 13 is a fragmentary sectional view showing the connecting shoes between the lever for shifting the ratchet drum and the adjacent section of the drive shaft of the mechanism.

In order that the construction, mounting and operation of my improved feed mechanism may be accurately understood, I have, in the drawings, illustrated the said mechanism in connection with a conventional type of sheet metal punch 10. This punch is formed with an anvil 11 overhanging which is the extension 12 of the punch. Extending horizontally through the extension 12 is the main drive shaft 13 of the punch and connected to the inner end of this drive shaft is a gear wheel 14 by which the punch is operated. Operatively connected with the other end of the drive shaft 13 and mounted for reciprocatory movement in the outer end of the extension 12 is the punch 14 arranged to coöperate with the anvil 11.

Coming now more particularly to the subject of the present invention I employ a bracket 15 connected to the forward side of the punch adjacent the gear wheel 14 to project laterally from the punch body. Journaled upon this bracket is the terminal section 16 of the flexible drive shaft 17 of my improved mechanism. The section 16 is hollow for a portion of its length and telescopically fitted therein is the adjacent section 18 of the said shaft. This section 18 is, as particularly shown in Fig. 3, provided with a longitudinally extending key way 19 and fitted through the adjacent end of the section 16 to engage within the said key way is a pin or key 20 connecting the said shaft sections for simultaneous rotary movement. Mounted upon the outer end of the section 16 of the shaft 17 is a collar 21 and arranged to abut this collar is a ratchet drum 22 mounted to rock upon the said shaft section. The ratchet drum 22 is formed with oppositely disposed arms 23 and 24 respectively. The arm 23 of the said drum is arranged to project upwardly into the path of rotary movement of a post 25 connected, as particularly shown in Figs. 1 and 2, to the inner side of the gear wheel 14 of the punch. The arm 24 of the said drum is, at its lower extremity, given a half turn and mounted upon the said arm to extend laterally therefrom is a pin 26. Connected to the outer side of the bracket 15 to project laterally therefrom into the path of the said pin is a stop post 27. Mounted upon the bracket 15 in the rear of the ratchet drum is an arm 27' which is, as particularly shown in Figs. 3 and 4, slotted to adjustably receive an upstanding pin 28 and extending between this pin and the arm 23 of the ratchet drum is a spring 29. Keyed upon the outer end of the shaft section 16 and housed within the ratchet drum 22 is a ratchet 30 held against displacement by a plate 31 secured by a screw or other suitable fastening device to the adjacent end of the said shaft section. Mounted upon the arm 23 of the ratchet drum to coöperate with the ratchet 30 is a spring pressed pawl 32.

As will now be observed, the post 25 upon the gear wheel 14 will, when the punch is operated, strike the arm 23 of the ratchet drum 22 to rock the said drum upon the section 16 of the shaft 17 and accordingly cause the pawl 32 to coöperate with the ratchet 30 for rotating the shaft by a step by step movement. When the ratchet drum is thus rocked upon the shaft section 16, the pin 26 will be moved away from the stop post 27 against the tension of the spring 29. Accordingly, when the post 25 upon the gear wheel 14 releases the arm 23 of the ratchet drum, the said spring will return the ratchet drum to normal position, the pin 26 striking the post 27 for limiting the ratchet drum in its movement under the influence of the said spring.

Keyed or otherwise secured upon the shaft section 16 at the inner side of the bracket 15 is a shipper ring 33. Rotatably fitted in this ring are suitable shoes 34 provided with radial pins 34' pivotally engaging through the upper and lower bowed portions of a lever 35 arranged with the said bowed portions thereof extending around the ring. As will be clear, the shoes 34 will thus ride within the ring 33 as the drive shaft is rotated and serve to operatively connect the lever 35 with the shaft section 16. Pivotally supporting the lever 35 at its inner end is a bracket 36 extending laterally from the bracket 15 and slidably supporting the lever at its outer extremity is a bracket 37. This bracket 37 is secured to the inner side of the bracket 15 at the outer end thereof and is provided at its outer extremity with an upstanding stop 38. Upstanding from the bracket 15 at the inner end of the bracket 37 is a post 39 and pivotally mounted upon this post is a latch 40. This latch is, as particularly shown in Fig. 3, arranged to engage over the lever 35 and extending between the said latch and the base of the bracket 37 is a spring 41 normally urging the latch downwardly to active position. Projecting laterally from the post 39 is a pin 42 for limiting the latch in its downward movement.

As will now be seen, by releasing the latch 40, the lever 35 may be shifted upon the bracket 37 to telescope the section 16 of the drive shaft 17 upon the section 18 of the said shaft and accordingly shift the ratchet drum 22 inwardly out of the path of the post 25 upon the gear wheel 14 when the lever may be engaged over the stop 38 upon the said bracket for locking the said ratchet drum in inactive position. The lever 35 may thus be operated for rendering the feed mechanism inactive while, when the said lever is shifted to position engaged by the latch 40, the said latch will act to lock the ratchet drum in active position. Owing to this shifting movement which may be imparted to the ratchet drum 22, the pin 28 upon the post 27' is adjustably connected to the said post so that the pin may be properly positioned with respect to the arm 23 of the said drum.

Mounted upon the forward side of the punch 10 below the anvil 11 is a base block 43 shown in detail in Fig. 11 of the drawings. This block is provided with a vertical dovetailed channel 44 in which is adjustably fitted a bearing slide 45. The body of this slide is formed with a longitudinally extending slot 46 and fitting loosely through the said slot and threaded into the base block is a set screw 47 for holding the slide at vertical adjustment upon the block. As particularly shown in Fig. 1 of the drawings, the bearing slide 45 rotatably receives the outer terminal section 48 of the drive shaft 17 and is arranged to support the said drive shaft section in a substantially horizontal position beneath the anvil 11. If desired, the shaft section 48 may be arranged to extend outwardly beyond the bearing slide 45 to detachably receive a hand wheel 49 at its outer end. Removably fitted upon the said drive shaft section and keyed or otherwise secured thereto at the outer side of the bearing slide 45 is a drive sprocket 50.

Arranged a suitable distance in the rear of the punch and opposite the outer end thereof is an idler sprocket stand 51 secured to the floor or other support upon which the punch is rested. As shown particularly in Fig. 9 of the drawings, this stand at its upper extremity is formed with spaced arms 52 from which extend lateral parallel forks 53. In the rear of the forks 53, the arms 52 of the said stand are provided with lateral enlargements 54 and screw threaded through the said enlargements to project between the arms of the forks 53 are set pins 55. Slidably fitted between the arms of the forks 53 to abut the set pins 55 are, as particularly shown in Figs. 8 and 10, coacting bearing blocks 56 and journaled upon these blocks is a transverse shaft 57. Keyed or otherwise secured to the shaft is an idler sprocket 58 arranged opposite to the drive sprocket 50. Extending between the said sprockets is an endless sprocket chain 59 having the upper reach thereof disposed in a plane slightly below the face of the anvil 11. As will now be observed, the set pins 55 upon the idler sprocket stand 51 may be adjusted for tensioning the sprocket chain.

Mounted between the stand 51 and the punch 10 is a work supporting table 60. This table is, as particularly shown in Fig. 7, provided with a plurality of transverse slots 61 in which are adjustably mounted a plurality of rest rollers 62 at opposite sides of which are arranged a plurality of guide rollers 63. The rest rollers 62 are adapted to support a metal sheet conventionally illustrated at 64, with the guide rollers 63 engaging the side edges of the sheet for directing the sheet over the anvil 11 of the punch. Mounted upon the punch body beneath the overhanging extension 12 thereof, is a longitudinally slotted bar 65 and adjustable upon this bar is a guide member 66 arranged opposite the punch 14'. The rollers of the guide member 66 are fixed to rigidly support the plate 64 at the adjacent edge thereof while the rollers of the guides 63 are preferably spring pressed so that these rollers may give to any unevenness in the side edges of the sheet. Detachably connected to the rear edge of the sheet is a clamp 67, which as best illustrated in Fig. 2 of the drawings, is provided with a depending hook 68 adapted to removably fit through any one of the links of the sprocket chain 59. If desired, a channeled edging strip 69 may be employed upon the inner edge of the sheet 64 to contact with the rollers of the guide member 66 so that the said strip will present a straight edge to the said rollers.

As will now be understood from the preceding description, the step by step movement imparted to the drive shaft 17 when the punch is operated as previously described, will be communicated to the sprocket chain 59 which, through the clamp 67 will accordingly advance the sheet 64 over the anvil 11 to be operated upon by the punch 14'. The sheet will thus be automatically fed to the punch. For varying the length of the step to be imparted to the sheet and correspondingly varying the distance between the holes punched therein, the drive sprocket 50 may be removed and another sprocket of either greater or less diameter substituted therefor. This substitution of a new drive sprocket will, as will be observed, effect the disposition of the upper reach of the sprocket chain 59 with respect to the sheet. The bearing slide 45 for the terminal section 48 of the drive shaft 17 is accordingly made adjustable so that the said slide may be positioned to maintain the upper reach of the drive sprocket chain parallel with the sheet for proper engagement with the clamp 67. In this connection, it is further to be observed that the length of the step to be imparted to the sheet 64 may be further varied by removing the ratchet 30 carried by the inner terminal shaft section 16 and substituting another ratchet of either greater or less diameter therefor.

Having thus described the invention, what is claimed as new is:

1. A feed mechanism for sheet metal punches including a drive shaft, coacting means carried by the said shaft and a driving element of the punch respectively for rotating the shaft by a step by step movement, a drive sprocket carried by the shaft, an idler sprocket stand mounted in the rear of the punch, lateral forks formed on the said stand, an idler sprocket adjustably supported upon the forks and removable at the outer ends thereof, a sprocket chain trained over the said sprockets, a work supporting table, and means engaged with the said chain and adapted for connection with a sheet upon the said table for advancing the sheet over the anvil of the punch as the said shaft is rotated.

2. A feed mechanism for sheet metal punches including a drive shaft, coacting means carried by the said shaft and a driving element of the punch respectively for rotating the said shaft by a step by step movement, a base block connected to the punch and formed with a channel, a bearing slide having an extension engaging in said channel to connect the slide with the block for adjustment thereon, the said slide receiving the outer terminal of the drive shaft, a drive sprocket carried by the said shaft terminal, an idler sprocket supported to coöperate with the drive sprocket, an endless chain trained over the said sprockets, a work supporting table, and means engaged with the chain and adapted for engagement with a sheet upon the said table for advancing the sheet over the anvil of the punch as the said shaft is rotated.

3. A feed mechanism for sheet metal punches including a drive shaft, coacting means carried by the said shaft and a driving element of the punch respectively for rotating the said shaft by a step by step movement, a bearing slide adjustable upon the punch, means loosely fitting through the said slide and adjustable to engage therewith for holding the slide at adjustment, the said slide receiving the outer terminal of the drive shaft, a drive sprocket carried by the said shaft terminal, an idler sprocket supported to coöperate with the drive sprocket, an endless chain trained over the said sprockets, a work supporting table, and means engaged with the chain and adapted for engagement with a sheet upon the said table for advancing the sheet over the anvil of the punch as the said shaft is rotated.

4. A feed mechanism for sheet metal punches including a drive shaft, means carried by the said shaft and a driving element of the punch respectively for rotating the said shaft by a step by step movement, a base block connected to the punch, a bearing slide adjustable upon the said block and provided with a longitudinally extending slot, means loosely fitting through the said slot and adjustable upon the base block for holding the slide at adjustment, the said slide receiving the outer terminal of the drive shaft, a drive sprocket carried by the said shaft terminal, an idler sprocket supported to coöperate with the drive sprocket, an endless chain trained over the said sprockets, a work supporting table, and means engaged with the chain and adapted for engagement with a sheet upon the said table for advancing the sheet over the anvil of the punch as the said shaft is rotated.

5. A feed mechanism for sheet metal punches including a drive shaft, coacting means carried by the said shaft and a driving element of the punch respectively for rotating the shaft by a step by step movement, a drive sprocket carried by the shaft, an idler sprocket supported to coöperate with the drive sprocket, a sprocket chain trained over the said sprockets, a work supporting table, means engaged with the said sprocket chain and adapted for engagement with a sheet upon the said table for advancing the sheet over the anvil of the punch as the said shaft is rotated, the drive sprocket being removable from the said shaft to be displaced by a drive sprocket of either greater or less diameter for varying the stepped travel to be imparted to the said sheet, and complemental means for adjustably elevating the shaft and tensioning the sprocket chain to compensate for different size drive sprockets.

6. In a feed mechanism for sheet metal punches, the combination with a sprocket chain, means for driving the said chain by a step by step movement and including a drive sprocket mounted to be displaced by a drive sprocket of either a greater or less diameter for varying the stepped travel to be imparted to the chain, and means connected with the chain for engagement with a metal sheet for advancing the sheet over the anvil of the punch upon the movement of the sprocket chain, of complemental means for adjustably elevating the said drive sprocket and tensioning the said chain to compensate for different size sprockets.

In testimony whereof I affix my signature.

JULIUS R. SCHADOW. [L. S.]